United States Patent

[11] 3,529,568

| [72] | Inventor | Frank S. Quin<br>308 Melrose Ave., Toronto 12, Ontario, Canada |
|---|---|---|
| [21] | Appl. No. | 839,213 |
| [22] | Filed | July 7, 1969 |
| [45] | Patented | Sept. 22, 1970 |

[54] UNDERWATER TEMPERATURE DETECTING DEVICE
6 Claims, 3 Drawing Figs.

[52] U.S. Cl. ..................................................... 116/114.5,
43/4, 73/343
[51] Int. Cl. ..................................................... G01k 1/14
[50] Field of Search ......................................... 116/114.5;
73/343; 43/4, 17(Cursory)

[56] References Cited
UNITED STATES PATENTS

| 2,609,689 | 9/1952 | Harris............................ | 73/343 |
| 3,031,788 | 5/1962 | Shannon....................... | 73/343 |
| 3,371,443 | 3/1968 | Dobson ........................ | 43/17 |

*Primary Examiner*—Louis R. Prince
*Assistant Examiner*—Daniel M. Yasich
*Attorneys*—James T. Wilbur, Frank I. Piper and Arne I. Fors ABSTRACT: A device which signals a fisherman when it is suspended in water of a preselected temperature. The device has a dial, an indicator needle, a hook, a bimetallic strip and a short length of chain. A first end of the chain is fixed to the device and a second end is connected to a fishing line and releasably connected to the hook. The bimetallic strip, according to its position, either maintains the hook in an engaging position with the second end of the chain or releases the hook so that it in turn releases the second end of the chain. The needle is manually turned so that it points to the temperature reading on the dial which corresponds to the temperature of the water in which the fisherman wishes his lure to be suspended. When the device reaches water of the desired temperature, the bimetallic strip releases the hook and the second end of the chain separates therefrom. The fishing line jerks upon release of the chain and the jerk serves as a signal to the fisherman that water of the desired temperature has been reached.

Patented Sept. 22, 1970

3,529,568

Inventor
FRANK S. QUIN by:

UNDERWATER TEMPERATURE DETECTING DEVICE

This invention relates to devices for detecting liquid of a preselected temperature and more particularly to a device adapted to be attached to the end of a fishing line and having a temperature sensitive element which gives out a signal when the device is immersed in water of a preselected temperature.

In summer time, game fish usually prefer to remain in the region of the thermocline of bodies of water or immediately above the thermocline. The thermocline refers to that zone of a water body in which the drop of temperature is at least 1°C. per foot of depth. The thermocline divides the upper layer of the water body, usually referred to as the epilimnion from the lower layer, usually referred to as the hypolimnion. It has been found that fish prefer the thermocline because of the favourable combination of temperature, oxygen and food supply. In the epilimnion, the temperature is usually too warm for the fish and in the hypolimnion, there is insufficient oxygen and food. Within the inhabited zone of the same species, fish are generally found in layers. The various layers may, and often do, overlap one another. If one is seeking a particular species of fish, one is likely to find such fish in water within a certain temperature range.

Apparatuses are known which are attached to lines to indicate the temperature of the water in which the devices are immersed. Such devices are of great assistance to fishermen since they indicate the temperature of the water in which the lures are to be suspended. A lure can therefore be suspended in a layer of water in which the desired species of fish is known to inhabit. Such devices are described in U.S. Pat. No. 2,570,879, dated Oct. 9, 1951 and granted to F. R. Steel, U.S. Pat. No. 2,609,689, dated Sept. 9, 1952 granted to C. G. Harris and U.S. Pat No. 3,031,788, dated May 1, 1962 granted to M. L. Shannon.

The above enumerated devices have many short comings. The devices described in U.S. Pats. Nos. 2,570,879 and 2,609,689 must be first immersed in water, then withdrawn to obtain a temperature reading. Thus to locate water of desired temperature, the devices must be repeatedly immersed and withdrawn from the water until water of the desired temperature has been found. The device described in U.S. Pat. No. 3,031,788 includes a temperature sensitive element positioned adjacent the fish-lure and a fishing line comprising two electrical conductors. The temperature of the water in which the sensitive element is located can be read from an instrument which is located in the fisherman's boat. Such a device is expensive and, since it must be used in conjunction with a special fishing line, inconvenient. In addition, the device cannot be readily adjusted should its temperature readings deviate from the actual temperature in which the sensitive element is located.

It is accordingly an object of the present invention to provide an apparatus for detecting water of a preselected temperature.

It is another object to provide an apparatus which is simple of manufacture and operation and may be readily adjusted.

It is another object to provide an apparatus which may be used in conjunction with a conventional fishing line.

A further object is to provide an apparatus having a dial and an indicator needle. The needle is manually turned so that it points to the temperature reading on the dial corresponding to the temperature of the water in which the lure is desired to be suspended. The device is then attached to the end of the fishing line and the device lowered into the water. When the device reaches water of the preselected temperature, the line jerks causing the tip of the rod to dip and bob up again. This jerk in the line can therefore be readily detected by the fisherman.

These and other objects may be accomplished by providing an apparatus for detecting water of a preselected temperature and adapted to be connected to the free-end of a fishing line and suspended in water including: a housing; a release member pivotally mounted within the housing; a signal line secured to the housing and releasably connected to the release member, the free-end of the fishing line being secured to the signal line so that when the apparatus is suspended in water, release of the signal line from the release member will result in lengthening of the distance between the apparatus and the free-end of the fishing line; an element mounted for movement from a contacting relation with the release member to a non-contacting relation therewith in response to a change in temperature; resilient means causing the release member to pivot upon movement of the element away from a contacting relation with the release member; and means for releasing the signal line from the release member upon movement thereof caused by the resilient means.

A fuller understanding of the invention may be had by referring to the following description of a preferred embodiment of the present invention taken in conjunction with the accompanying drawing in which.

Like reference characters refer to like parts throughout the description of the drawing.

Figures 1, 2, 3:
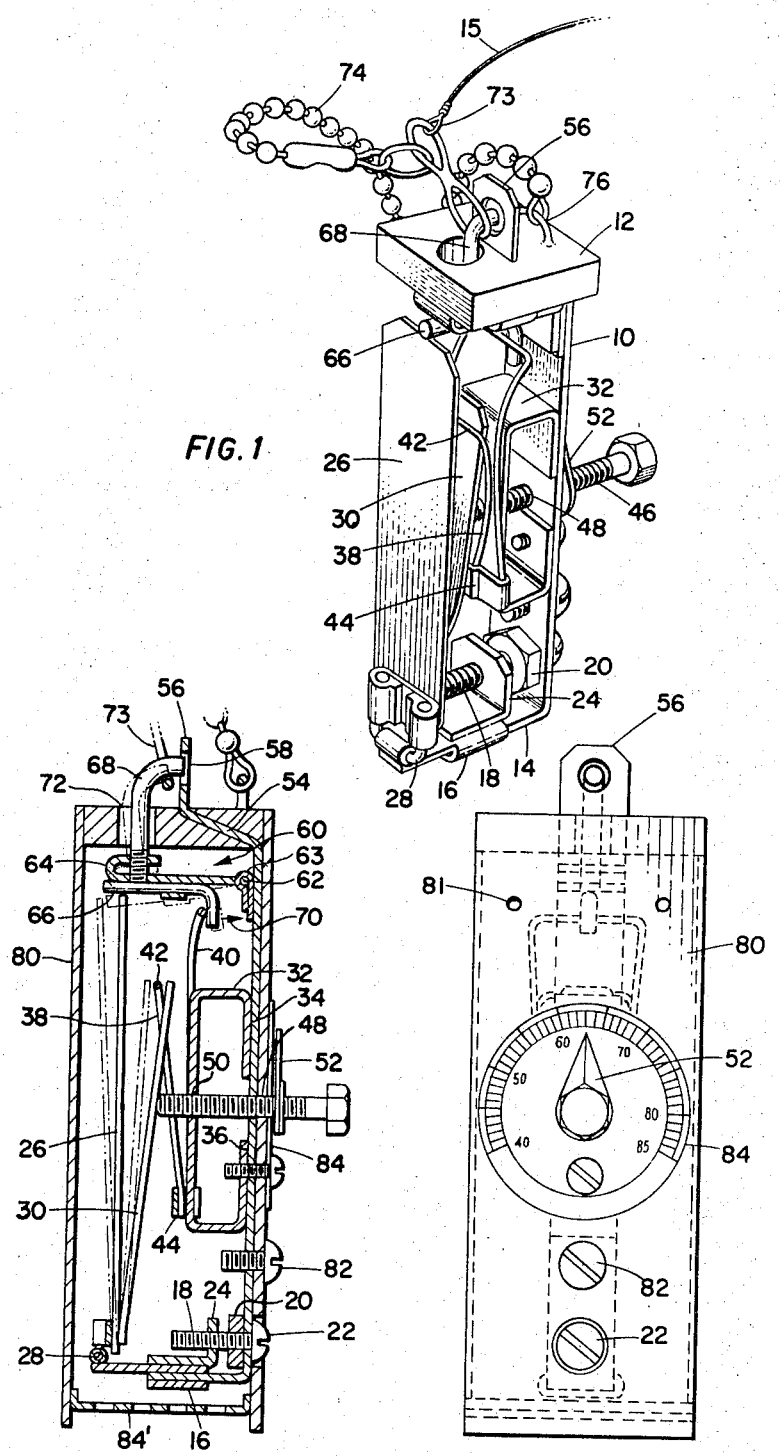
FIG. 1 is a perspective view of the apparatus separated from its housing.
FIG. 2 is a side elevation of the apparatus separated from its housing.
FIG. 3 is a front elevation of the apparatus contained within its housing.

With reference to FIG. 1, the apparatus according to the invention includes a side wall 10, a top plate 12 and a lower wall 14. The apparatus is shown connected to a fishing line 15.

A sleeve 16 is positioned about wall 14 and is movable therealong by means of adjustment screw 18. As shown, the shank of screw 18 projects through and is freely rotatable within an aperture in side wall 10. The screw is prevented from moving out of the aperture by a nut 20 secured by suitable means to the shank at the side of wall 10 opposite head 22. The end of the shank is threadably received within an aperture formed on lug 24 and lug 24 is secured to sleeve 16. Thus, by rotating screw 18, sleeve 16 moves along lower wall 14.

A temperature sensitive element 26, preferably a bimetallic strip, is pivotally secured at 28 to one end thereof to an extending lip of sleeve 16. A limb 30 is secured to element 26 in proximity to connection 28 and diverges outwardly therefrom.

A generally C-shaped bracket 32 is also mounted to side wall 10. Bracket 32 has a pair of inwardly projecting arms 34 and 36 which are secured to the inside surface of wall 10. Two resilient means 38 and 40 are secured to the web of the bracket. Preferably the resilient means are springs formed of phosphor bronze and for the sake of simplicity are described hereinafter as "springs". Spring 38 has a pair of spaced apart limbs and a web 42. The free-ends of the limbs are held in contact with bracket 32 by clip 44. Web 42 engages limb 30 and remains in contact therewith when the limb swings to the left.

A dial screw 46 threadably received within apertures 48 and 50 formed in side wall 10 and bracket 32 respectively. An indicator needle 52 is secured to the screw 46 for a purpose to be explained below. The end of screw 46 contacts limb 30 so that upon rotation of screw 46 in one direction, the end of the screw will move to the left from the position illustrated in full-lines in FIG. 2 and will cause limb 30 to pivot to the left about connection 28. As temperature sensitive element 26 is fastened to limb 30, it too will pivot to the left and away from the side wall. Upon rotation of screw 46 in the opposite direction, spring 38 will cause limb 30 to pivot to the right and remain in contact with the end of the screw.

The upper end of side wall 10 remote from lower wall 14 projects inwardly at 54 and terminates at a distal portion 56. Connected to the side wall in proximity to its upper end is a release member generally indicated 60. A pintle 62 is formed at one end of member 60 which pintle is mounted within barrel 63 fastened to the inside surface of wall 10. Release member 60 is composed of a J-shaped portion 64, an L-shaped portion 66 and a hook 68. As seen in FIG. 2, the lower end of hook 68 is threadably received within apertures formed in portion 64. The upper end of the hook projects through an aperture 72 formed in top plate 12 and fits into an aperture 58 in distal portion 56.

The horizontally disposed limb of L-shaped portion 66 is connected along its length to portion 64 preferably by soldering. Spring 40 contacts the other limb of portion 66 and applies a force thereto in the direction of arrow 70. Release member 60 is prevented from rotating counterclockwise under the urging of spring 40 by the free-end of bimetallic element 26 which contacts an end of L-shaped portion 66.

A loop 73 is formed in the end of a flexible signal line or chain 74 and the loop is retained by hook 68 when in the position illustrated in FIG. 1. The opposite end of chain 74 is secured to top plate 12 at 76. The end of fishing line 15 is also releasably secured to loop 73.

With reference to FIGS. 2 and 3, the apparatus according to the invention is mounted within a housing 80 and is held therein by means of screws one of which is shown and marked 82. A screen 84' is secured to the lower portions of housing 80 and defines the lower wall thereof. A plurality of apertures 81 are formed about the upper portion of the housing. Consequently water will freely circulate within the housing when the apparatus is immersed in water.

The dial indicated at 84 of the apparatus according to the invention is graduated as follows. The apparatus is immersed in liquid of a known temperature. Adjustment screw 18 is rotated until the free-end of bimetallic element 26 just moves out of contact with L-shaped portion 66 and spring 40 causes release member 60 to rotate counterclockwise. The new position assumed by element 26 and release member 60 is illustrated in dashed lines in FIG. 2. The location on dial 84 to which indicator needle 52 points should be marked with the known temperature.

The release member is then manually returned to the position illustrated in full lines by backing up dial screw 46 so that bimetallic strip may return to a position beneath portion 66 then squeezing the top of hook 68 and distal portion 56 together. The apparatus is then immersed in water of a different known temperature. Screw 18 should again be adjusted until the free-end of the bimetallic strip again moves out of contact with L-shaped portion 66. The new location on dial 84 to which the indicator needle points should be marked with the new known temperature. Provided element 26 deflects linearly with changes in temperature, the dial can be easily graduated by placing marks spaced apart an equal distance along its periphery, each mark corresponding to a Fahrenheit or Centigrade degree or multiple or fraction thereof.

After the dial has been graduated, the apparatus is used in the following manner. The indicator needle is turned to the reading corresponding to the temperature of the water into which it is desired to cast a lure. The end of the fishing line is then attached to loop 73 which, in turn, is attached to hook 68 and the apparatus is lowered into the water by unreeling the fishing line. It is necessary to count the number of times the fishing reel revolves as the apparatus is being lowered. When water of the preselected temperature is reached, the free-end of element 26 will move out of contact with L-shaped portion 66, release member 60 will turn counterclockwise and loop 73 will be released by hook 68. Immediately thereafter, the apparatus will fall downward under gravity until chain 74 becomes taut. The sudden release of the apparatus and jerk when the chain becomes taut will jerk the tip of the rod.

When the jerk in the fishing line is detected, the line is reeled in and a fishing lure is substituted for the apparatus according to the invention. The fishing line is unreeled the same number of turns as the line was unreeled previously and the lure will be suspended in water of the required temperature.

When it is desired to reuse the apparatus, the hook should be moved manually upward to rotate the release member clockwise. Needle 52 is then turned to move screw 46 backward from limb 30. Spring 42 will cause release member 60 to return to a position beneath L-shaped portion 66.

Should the apparatus go out of adjustment due to a fall or for other reasons, it may be easily returned to proper adjustment. The indicator needle is set at a preselected temperature and the apparatus is immersed in water of the same temperature. Screw 22 is then turned until chain 74 just separates from the hook. The apparatus will then be in correct adjustment. If however the signal line separates as soon as the apparatus is suspended in the water, screw 22 should be backed up and the hook moved back manually into aperture 58. Screw 22 should then be advanced until the hook just releases the signal line.

It will be understood of course that modifications can be in the preferred embodiment of the invention described and illustrated herein without departing from the scope and purview of the invention as defined by the appended claims.

I claim:

1. An apparatus for detecting liquid of a preselected temperature and adapted to be connected to the free-end of a fishing line and suspended in liquid including: a housing; a release member mounted within the housing; a signal line secured to the housing and releasably connected to the release member, the free-end of the fishing line being secured to the signal line so that when said apparatus is suspended in liquid, release of the signal line from the release member will result in lengthening of the distance between the apparatus and the free-end of the fishing line; an element mounted for movement from a contacting relation with the release member to a non-contacting relation therewith in response to change in temperature; resilient means causing the release member to pivot upon movement of the element away from a contacting relation with the release member; and means for releasing the signal line from the release member upon pivotal movement thereof caused by the resilient means.

2. The apparatus claimed in claim 1 wherein apertures are formed in said housing to permit free circulation of liquid therein when said apparatus is immersed in liquid.

3. The apparatus as claimed in claim 2 further including means for adjusting the position of the element so that said element moves away from contacting relation with the release member upon immersion of the element in liquid of a preselected temperature.

4. The apparatus as claimed in claim 1 wherein said member is pivotally mounted to said housing, said element is pivotally mounted to a sleeve and means is provided for adjusting the location of said sleeve within said housing.

5. The apparatus as claimed in claim 4 wherein said element is a bimetallic strip.

6. An apparatus for detecting water of a preselected temperature and adapted to be connected to the free-end of a fishing line and suspended in water including: a housing; a release member mounted to said housing and having a hook at one end; an elongated flexible signal line, one end of which being secured to the housing and the other end of which being releasably connected to the hook and secured to the free-end of the fishing line; a lower wall secured to the housing; a sleeve positioned about the wall; means for adjusting the position of the sleeve on the wall; a bimetallic strip pivotally mounted to the sleeve and adapted to move from a contacting relation with the release member to a non-contracting relation therewith in response to a change in temperature; means for adjusting the bimetallic strip so that said strip will move away from contacting relation with the release member upon immersion of the strip in water of a preselected temperature; and resilient means causing the release member to pivot upon movement of the bimetallic strip away from a contacting relation with the release member and thereby releasing the end of the signal line from the hook.